United States Patent [19]

Eguchi

[11] 4,276,906
[45] Jul. 7, 1981

[54] SINGLE-SEAT GLOBE CONTROL VALVE

[76] Inventor: Katsumi Eguchi, 26-16, Kurobaru 2-chome, Kokura-Kita-ku, Kitakyushu City, Fukuoka Prefecture, Japan

[21] Appl. No.: 959,777

[22] Filed: Nov. 13, 1978

[30] Foreign Application Priority Data

Nov. 16, 1977 [JP] Japan .................. 52/136683

[51] Int. Cl.³ .................. F16K 47/14; F16K 47/04
[52] U.S. Cl. .................. 137/625.38; 251/120
[58] Field of Search .................. 251/120; 137/625.35, 137/625.38

[56] References Cited

U.S. PATENT DOCUMENTS

| 833,973 | 10/1906 | Petsche | 137/625.38 |
| 1,126,595 | 1/1915 | Walker | 137/625.35 |
| 1,143,999 | 6/1915 | Rosencrans | 137/625.38 |
| 1,383,005 | 6/1921 | Mertens | 137/625.38 X |

Primary Examiner—Arnold Rosenthal
Attorney, Agent, or Firm—Wenderoth, Lind & Ponack

[57] ABSTRACT

A single-seat globe control valve having a disk positioned firmly in an inlet-chest of a valve body so as to face an opening in a dividing wall and an inverted bottle-shaped floating cylinder that has a seat portion at its lower end against which the disk comes into airtight contact. The floating cylinder is airtightly fitted in the opening in the dividing wall for being moved up and down and has many small openings in its peripheral wall which connect its inside with an outlet-chest, and further, has a valve stem connected at its upper end. A fluid from the inlet chest which is regulated between the disk and the seat portion of the floating cylinder, enters an empty space inside the latter. The fluid flowing through the small holes into the outlet-chest has thus been controlled to the desired pressure or flow rate. This control valve does not leak when it is closed, and can be opened and closed with a small amount of force.

6 Claims, 9 Drawing Figures

SINGLE-SEAT GLOBE CONTROL VALVE

BACKGROUND OF THE INVENTION

This invention relates to a control valve that controls the pressure or volume of a fluid, and more particularly to a single-seat globe control valve.

According to their design, the control valves can be classified as globe, angle, butterfly, ball, sluice or other types. Because of its rigid structure and good controlling characteristics, the globe type is most widely used. Globe control valves fall into two broad classifications, depending on the number of seat it contains: (1) the double-seat type; and (2) the single-seat type.

The double-seat globe control valves have an advantage in that their stems can be driven with a remarkably small amount of force. However, this type of valve cannot achieve a perfectly tight closure because it has to close two seats at a time. This results in considerable leakage even while the valve is closed. Due to its high susceptibility to erosion and cavitation, the body and other parts rapidly wear out or break down thus causing annoying noises.

As opposed to the double-seat type, the conventional single-seat globe control valves have good shut-off and dynamic characteristics. However, they require a considerably large amount of force to drive their stems.

This invention has solved the aforementioned problems with the conventional control valves.

SUMMARY OF THE INVENTION

An object of this invention is to provide a single-seat globe control valve that eliminates leakage while it is closed, has a stem which is capable of being driven with a small amount of force, and operates dependably.

Another object of this invention is to provide a single-seat globe control valve that is smaller and more durable than conventional.

To achieve the aforementioned objects, a single-seat globe control valve according to this invention has a disk firmly positioned in an inlet-chest of a valve body so as to face an opening in a dividing wall and an inverted bottle-shaped floating cylinder, that has a seat portion at its lower end against which the disk comes into airtight contact with, is air-tightly fitted in the opening in the dividing wall so as to move up and down and has many small openings in its peripheral wall connecting its inside with an outlet-chest, and has a valve stem connected at its upper end.

BRIEF DESCRIPTION OF THE DRAWINGS

For a better understanding of the invention, the preferred embodiments thereof will now be described in detail, with reference to the accompanying drawings, in which:

FIG. 1a is a conventional double-seat globe control valve,

FIG. 1b is a conventional single-seat globe control valve, and

FIG. 1c is a conventional single-seat globe control valve having a piston-like disk fitted in a cylinder-like guide.

DETAILED DESCRIPTION OF THE INVENTION

Figure 1A:
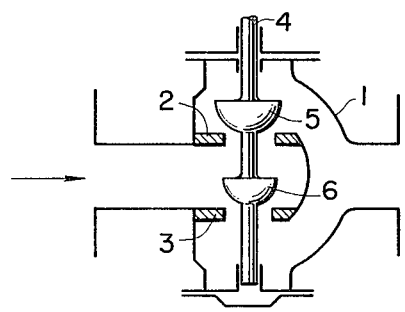
FIGS. 1(a) through 1(c) are schematic diagrams of different types of globe control valves currently in use.

Referring first to FIG. 1, problems with the conventional globe control valves will be explained in detail.

FIG. 1 shows a double-seat globe control valve having two seats 2 and 3 in a body 1 and two disks 5 and 6 on a stem 4. This control valve can regulate a large volume of fluid. Because the force acting on the stem 4 depends on the difference between projecting areas of the upper and lower disks on the corresponding seats, the force for driving the stem 4 can be remarkably reduced by substantially equalizing the projected areas of the two disks. Therefore, this type of valve is widely used in large-diameter applications. When closed, however, it cannot shut fluid completely off because the disks 5 and 6 have to close the seats 2 and 3 simultaneously. Fluid leakage is much greater than in the single-seat type. In addition, its intricate interior makes the disk motion unstable, which in turn induces erosion and cavitation. Consequently, the body and other parts wear out rapidly or break down and noise becomes intolerable.

Figure 1B:
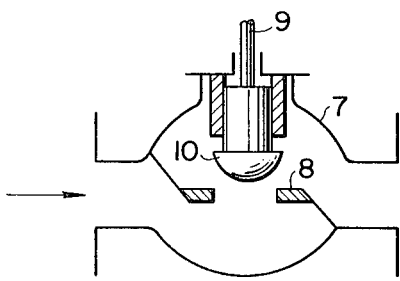

FIG. 1b shows a single-seat globe control valve having a seat 8 in a body 7 and a disk 10 on a stem 9. Contrary to the above-described two-seat globe control valve, this type has good shut-off and dynamic characteristics. However, the force acting on the step 9 depends on the product of the projected area of the disk 10 on the seat 8 and the difference between two pressures at the inlet and outlet of the valve. Accordingly, it requires more force than the double-seat type. When the output of a valve actuating system or an operating machine is limited, the allowable differential pressure of fluid becomes small. Consequently, this type of valve is available only having small diameters.

Figure 1C:
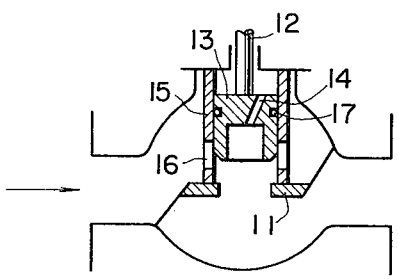

FIG. 1c shows a single-seat globe control valve requiring less stem driving force than the above-described type. A piston-like disk 13 is disposed upstream of a seat 11 so that the disk 13 moves up and down along a cylindrical guide 15. Fluid flows from upstream to downstream through openings 16 in the peripheral wall of the guide 15. This disk 13 carries a piston ring 17 and has a small opening 14. The piston ring 17 prevents leakage during the closing of the valve, while the small opening 14 reduces the force acting on the stem 12 by maintaining a pressure balance between above and below the disk 13. When opened half-way, however, the oscillating motion of fluid directly under the disk 13 applies an intricately changing force to the top and bottom surfaces of the disk 13. Therefore, a disk having a low inertia tends to vibrate, and develops noise and erosion.

Figure 2:
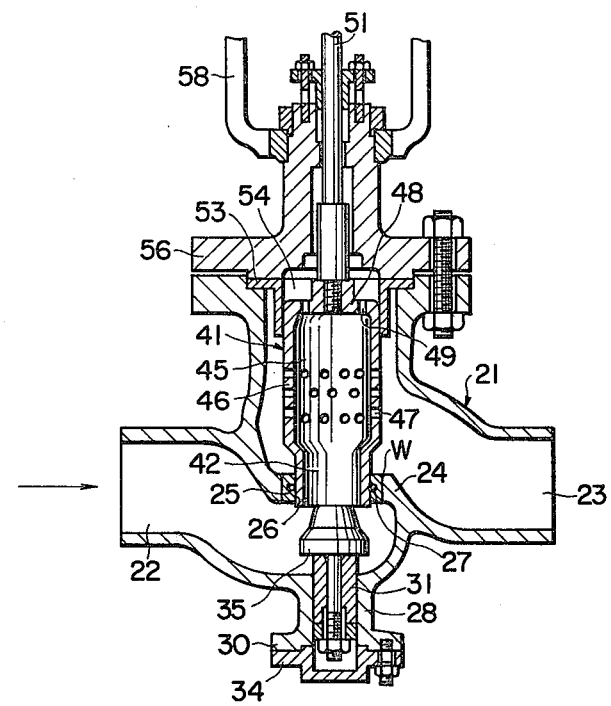
FIG. 2 is a cross-sectional view of a control valve according to this invention.
Figure 3:
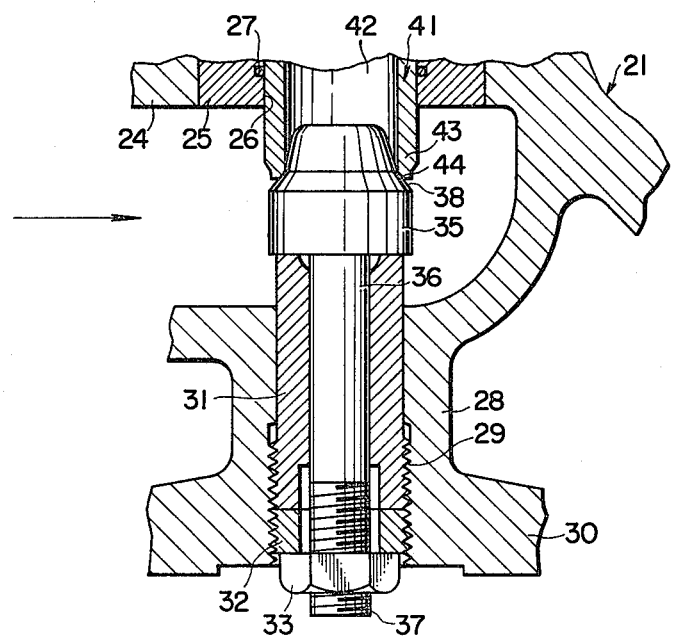
FIG. 3 is an enlarged cross-sectional view showing the principal part of the control valve shown in FIG. 2.

FIG. 2 shows a control valve embodying the principle of this invention. A body 21 is of the single-seat type. An inlet chest 22 and an outlet chest 23 are separated by a wall 24. A guide ring 25 is inserted, and attached by welding W, to the dividing wall 24 at an opening therein. The guide ring 25 has a vertical opening 26, through which the inlet chest 22 communicates with the outlet chest 23. A cylindrical projection 28 is extends from the bottom of the body 21. The lower portion of the projection 28 has threads 29, on which a disk holding sleeve 31 is screwed (FIG. 3). A shaft 36 which extends from the bottom of a disk 35 is inserted in the disk holding sleeve 31 so that the disk 35 faces the opening 26. The vertical position of the disk 35 is defined by the vertical position of the disk holding sleeve 31, which is locked by a threaded die 32 which is screwed thereunder. The disk 35 is fixed to the disk holding sleeve 31 by a nut 33 which is screwed onto a thread 37 at the lower end of the shaft 36. The bottom of the body 21 is sealed by a bottom cover 34 which is attached to a flange 30 of the projection 28. A space between the dividing wall 24 and the guide ring 25 is sealed by the welding W.

An inverted bottle-shaped floating cylinder 41 is disposed opposite to the disk 35 which is fixed in the inelt chest 22 of the body 21. The floating cylinder 41 has a throat 42, in the lower portion, which is slightly smaller in diameter than an upper hollow chamber 45 and the throat 42 is slidably fitted in the opening 26 in the dividing wall 24. A packing 27, such as an O-ring, is fitted in the opening 26, so that the floating cylinder 41 slides up and down without impairing the airtightness of the inlet chest 22 and outlet chest 23. The lower end of the floating cylinder 41 has a seat 43 which has a contact surface 44 that comes in contact with a contact surface of the disk 35 to maintain airtightness. A number of small openings 47, which open to the outlet chest 23, are located in a peripheral wall 46 of the hollow chamber 45 above the throat 42. The top end 48 of the floating cylinder 41 is connected to the lower end of a stem 51.

A floating cylinder guide 53 is located in the upper portion of the body 21, and is held down by a cover 56. An operating machine (not shown) which is attached to a stand 58 moves the floating cylinder 41 up and down through the guide ring 25 and the floating cylinder guide 53. The top end 48 of the floating cylinder 41 has a communicating port 49 for introducing fluid pressure from the hollow chamber 45 to a piston chamber 54 in the floating cylinder guide 53, thereby balancing the pressure operating from above and below the top end 48.

The dividing wall 24 can have such an opening that directly guides the floating cylinder 41, without fitting a guide ring therein.

Subsequently, the operation of the above-described control valve will be described.

To close the valve, the operating machine (not shown) lowers the floating cylinder 41 to press the contact surface 44 thereof against the contact surface 38 of the disk 35. As a result, the flow of fluid between the body 35 and the floating cylinder 41 is cut off. The fluid flow between the guide ring 25 and the floating cylinder 41 is prevented by the packing 27 which is secured in the opening 26. Due to its single-seat design, this control valve shuts off fluid much more effectively than the double-seat type control valve.

To regulate the fluid pressure or volume, the operating machine raises the floating cylinder 41 to a desired position. The fluid pressure or volume is regulated by a change in the area of a fluid passage which is formed between the disk 35 and the seat 43 at the lower end of the floating cylinder 41. Regulated between the disk 35 and the seat 43 of the floating cylinder 41, fluid from the inlet chest 22 attains higher speed, then loses some injection energy due to interference within the throat 42 of the floating cylinder 41. Beyond the throat 42, the fluid slows down in the large hollow chamber 45, or expands to attain a slightly higher static pressure. The fluid flows from the hollow chamber 45 through the small openings 47, in all directions, into the outlet chest 23, whereupon the fluid pressure drops further. Holding the fluid temporarily in the hollow chamber 45 helps to relieve the dynamic instability due to a sudden change in the pressure and direction of the fluid flow. Injection of the fluid through the small openings 47 increases the transmission loss of sound pressure energy, and thereby lowers the noise level. A stable upward force caused by dynamic pressure acts constantly on the floating cylinder 41, because the top end 48 thereof faces the direction of the flow. This is conducive to a marked stabilization of the dynamic characteristics.

Figure 4:
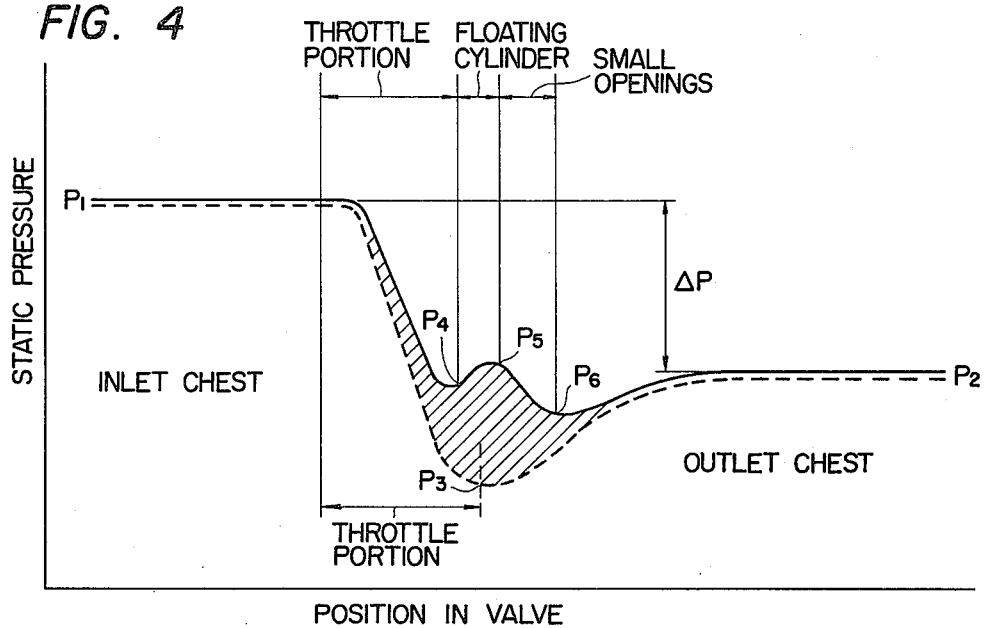
FIG. 4 is a graphical comparison of the pressure characteristics between the control valve of this invention and a conventional one.

Referring now to FIG. 4, the dynamic effect of the floating cylinder 41 will be described. In this figure, reference character $P_1$ designates pressure at the inlet end, and $P_2$ denotes pressure at the outlet end. The dotted line indicates the pressure characteristic of the conventional single-seat control valve, and the solid line indicates that of the control valve according to this invention. Regulated between the disk and the seat, the fluid pressure in the conventional control valve drops to $P_3$, then recovers to $P_2$ at the outlet end. By contrast, the fluid pressure in the control valve of this invention drops to $P_4$ when being regulated between the disk 35 and the seat 43 and then recovers to $P_5$ in the floating cylinder 41. Subsequently, by being controlled again by the small openings 47, the pressure drops to $P_6$, and finally recovers to $P_2$ at the outlet end. In FIG. 4, the hatched portion represents a drop in the turbulence energy, due to the operation of the floating cylinder 41, which increases dynamic stability and decreases erosion and noise. The weight and, therefore, inertia of the floating cylinder 41 are large enough to insure high dynamic stability. Also, the floating cylinder guide 53 and the guide ring 25 provide a contact area which is large enough to establish considerable resistance against the vibration caused by the fluid.

By being attached at the bottom of the body 21, the disk 35 does not vibrate even when the dynamic pressure of the fluid changes in the regulating zone.

As described previously, the pressure in the hollow chamber 45 of the floating cylinder 41 is balanced with that in the piston chamber 54 in the floating cylinder guide 53. This balance offsets the upward static pressure acting on the floating cylinder 41. Further, the injected stream from the communicating port 49 develops a back pressure, which absorbs part of dynamic pressure. Consequently, no excessively unbalanced force acts on the floating cylinder 41. However, it should be noted that the floating cylinder 41 cannot be kept in a dynamically stable state in the absence of some upward force. Where the pressure difference or volume of fluid is small, the floating cylinder guide 53 can be eliminated.

The force needed for closing this type of valve is very i.e., substantially equal to one for the control valve shown in FIG. 1c. Given that the seat 43 of the floating cylinder 43, contacting the disk 35, has an outside diameter $D_1$ and an inside diameter $D_2$, the effective pressurized area of the floating cylinder 41 during the closing of the valve can be expressed as $\pi(D_2^2-D_1^2)/4$. Assuming that $D_1=1$ and $D_2=0.9$, the effective pressurized area, or the closing force, of this valve will be approximately ¼ that of the single-seat control valve shown in FIG. 1b.

Figure 5:
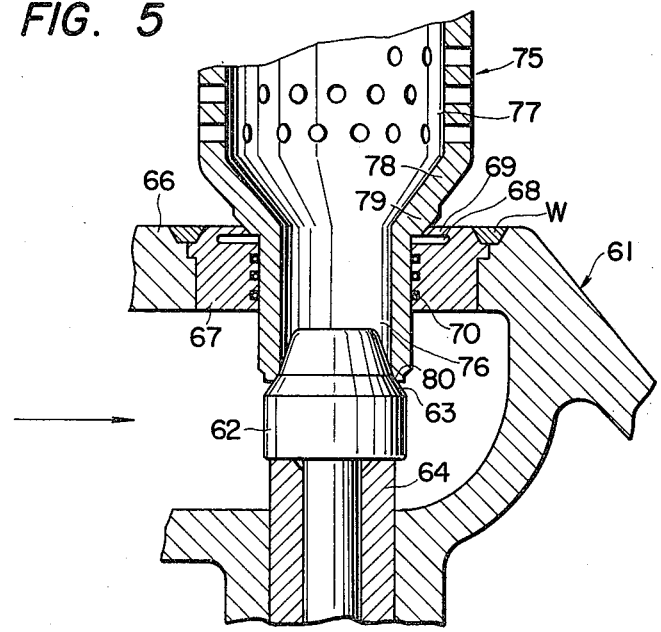
FIG. 5 is a cross-sectional view of the principal part of another embodiment of this invention for use high-temperature situations.

From the standpoint of dynamic stability, it is desirable that the hollow chamber 45 of the floating cylinder 41 have a three to four times larger capacity than the throat 42, and that the total area of the small openings 47 be approximately three to five times larger than the cross-sectional area of the throat 42.

Where high-temperature fluid is involved, a soft packing, such as an O-ring, cannot be used with the guide ring. Some special provision should be made to keep airtightness between the guide ring and the floating cylinder. FIG. 5 shows the principal part of a control valve for use with high-temperature fluids, such as steam. A body 61, disk 62, a disk holding sleeve 64 and some other parts are similar to those of the control valve shown in FIG. 2. A metal guide ring 67 is fitted in a dividing wall 66 and attached by welding W. An annular groove 68, which opens inward, is cut in the upper end of the guide ring 67, and a flexible seat 69, which has a tongue-like cross section, is fitted therein. The guide ring 67 also has a labyrinth shaped groove 70 below the groove 68. A seat 79, which is adapted to come in contact with said flexible seat 69, is located on the external surface of a shoulder 78 extending between a throat 76 and a hollow chamber 77 of a floating cylinder 75.

When this valve is closed, the contact surface 63 of the disk 62 comes in contact with the contact surface 80 of the floating cylinder 75 to keep airtightness between the disk 62 and the floating cylinder 75. Likewise, the flexible seat 69 comes into contact with the seat 79 of the floating cylinder 75 to secure airtightness between the guide ring 67 and the floating cylinder 75. The flexible seat 69 can bend either upward or downward while the valve is closed. Therefore, fluid is shut off by the contact surface 63 of the disk 62 and the flexible seat 69 by vertically moving the disk 62 a small distance. When the valve is open, the labyrinth groove 70 prevents leakage from between the inside of the guide ring 67 and the outside of the floating cylinder throat 76. All of this reduces errors due to leakage and thereby enhances the control characteristic.

Figure 6:
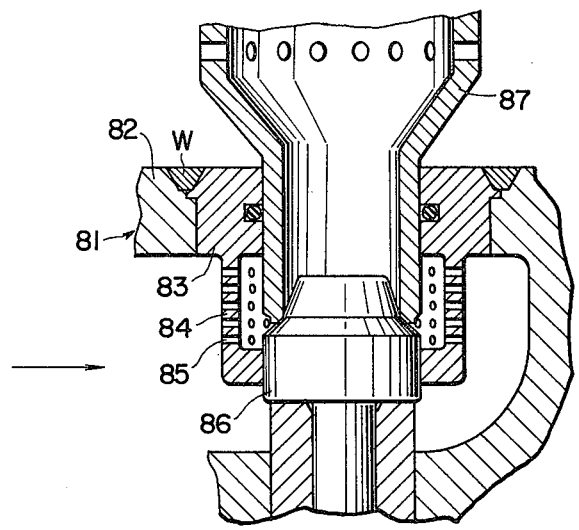
FIGS. 6 and 7 are cross-sectional views respectively, showing the principal part of two other embodiments of this invention that are specially designed to have low noise.

FIG. 6 shows the principal part of a control valve that aims at a further decrease in noise. A body 81, a disk 86, a floating cylinder 87 and some other parts are identical to those in the embodiment shown in FIG. 2. A guide ring 83 is fitted in a dividing wall 82 and secured thereto by welding W. The guide ring 83 has a cylindrical wall 84 that extends downward and has a number of small openings 85. The upper half of the disk 86 rests in this cylindrical wall 84. In a control valve of this design, the decreased flow speed and increased turbulence of fluid, both due to the passing through the small openings 85, increases the transmission loss in sound pressure energy, which results in a drop in the noise level. Doubling the cylindrical wall 84 enables additional noise reduction.

Figure 7:
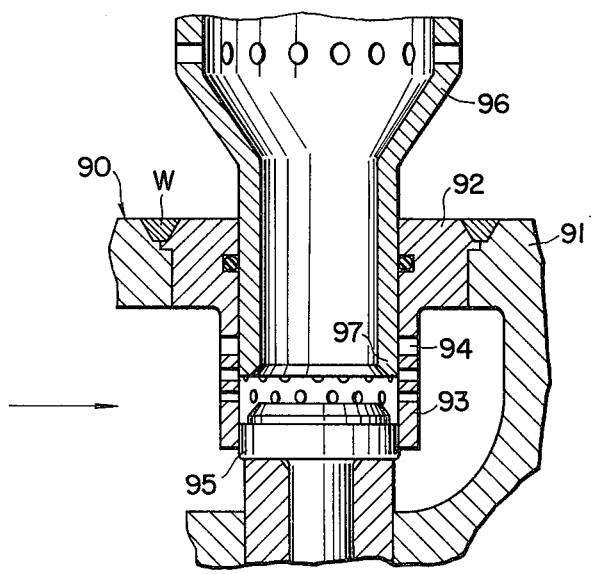

FIG. 7 shows the principal part of a noise-reducing control valve similar to one in FIG. 6. A guide ring 92 which is attached to a dividing wall 91 in a body 90 at a weld W, has a cylindrical wall 93 projecting downward. A disk 95 fits in the lower end of this cylindrical wall 93. A seat 97 located at the bottom of a floating cylinder 96 is pressed against the disk 95 inside the cylindrical wall 93. The cylindrical wall 93 has a number of small openings 93. The total area of the small openings 93 between the disk 95 and the seat 97 of the floating cylinder 96 is adjusted by moving the floating cylinder 96 up and down. By this means, the pressure or volume of fluid is regulated.

This design permits reduction of noise by equalizing the speed distribution and increasing the frictional loss of fluid at the throttle outlet. The disk 95 functions only to close the seat. The small openings 93 can be circular, square, rectangular or slit-like, or irregularly shaped.

As described above, the control valve of this invention needs less actuating force, and develops equal or less leakage when closed, as compared to the conventional single-seat globe control valve. The improved dynamic characteristics remarkably decrease vibration, erosion and noise. Smaller and more durable control valves can be made as a result.

The control valve according to this invention can be used with both liquids and gases, and with pipes having a nominal diameter of not smaller than 50 mm.

What is claimed is:

1. A single seat globe control valve comprising:
   a body having an inlet chest and an outlet chest;
   a dividing wall located in said body between said inlet chest and said outlet chest for separating said inlet chest from said outlet chest, said dividing wall having a vertical opening therein for allowing communication between said inlet chest and said outlet chest;
   a disk secured to the bottom of said inlet chest and spaced opposite said opening in said dividing wall;
   an inverted bottle shaped floating cylinder having a cylindrical hollow chamber and communicating with a cylindrical throat extending downward therefrom, said cylindrical throat being smaller in diameter and volume than said cylindrical hollow chamber, said cylindrical hollow chamber being disposed for upward and downward movement in said outlet chest and having a plurality of small openings in the peripheral walls thereof;
   said cylindrical throat having a seat which is adapted for coming in contact with said disc for airtightly sealing therewith, said cylindrical throat being slidably and airtightly fitted in said opening in said dividing wall; and
   a stem connected to the top end of said floating cylinder.

2. A single-seat globe control valve as defined in claim 1, wherein said hollow chamber in said floating cylinder has a three to four times larger volume than said throat thereof, and the total area of said plurality of openings is three to five times larger than the cross-sectional area of said throat.

3. A single-seat globe control valve as defined in claim 1, further comprising a guide ring fitted in said opening in said dividing wall, said guide ring having a vertical opening therethrough which allows communication between said inlet and outlet chests.

4. A single-seat globe control valve as in claim 3, further comprising a seal located around the outer surface of the connecting section between the hollow chamber and throat of the floating cylinder, said guide ring having an annular groove which is located in the upper portion thereof and which opens inward, said annular groove having a flexible seat having a tongue-like cross section is located therein, said seal seat contacting said flexible seat, and a labyrinth groove located along the opening in said guide ring.

5. A single-seat globe control valve as in claim 3, wherein said guide ring includes a downwardly-extending cylindrical wall which has a number of small openings, and the upper half of said disk resting therein.

6. A single-seat globe control valve as defined in claim 1, further comprising a hollow guide sleeve, for guiding said upward and downward movement of said floating cylinder, which is mounted in said outlet chest of said body, and has a communicating port for connecting said hollow chamber in said floating cylinder with the hollow interior of said guide sleeve, said communicating port being located in the top end of said floating cylinder.

* * * * *